United States Patent [19]

Decker

[11] Patent Number: 4,793,645

[45] Date of Patent: Dec. 27, 1988

[54] TWO HANDLED SHOVE WITH ELASTOMERIC HINGE

[76] Inventor: Mark Decker, 7660 S. Creek Rd., Girard, Pa. 16417

[21] Appl. No.: 152,975

[22] Filed: Feb. 8, 1988

[51] Int. Cl.⁴ .......................... A01B 1/22; B25G 3/38
[52] U.S. Cl. .................................................... 294/58
[58] Field of Search .............. 294/53.5, 54.5, 57, 294/58; 16/110 R, 114 R, 225, 277; 254/131.5

[56]  References Cited

U.S. PATENT DOCUMENTS

| | | | |
|---|---|---|---|
| 606,534 | 6/1898 | Gifford | 294/58 X |
| 911,291 | 2/1909 | Byor | 294/58 |
| 982,145 | 1/1911 | Langlois | 294/58 |
| 1,074,889 | 10/1913 | Moore | 294/58 |
| 2,521,441 | 9/1950 | Bickley | 294/58 |
| 4,128,266 | 12/1978 | Vaslas | 294/58 |
| 4,129,327 | 12/1978 | Moore | 294/58 |

FOREIGN PATENT DOCUMENTS

| | | | |
|---|---|---|---|
| 948860 | 8/1949 | France | 294/58 |
| 166779 | 7/1921 | United Kingdom | 294/58 |
| 974584 | 11/1964 | United Kingdom | 294/58 |

*Primary Examiner*—Johnny D. Cherry
*Attorney, Agent, or Firm*—Charles L. Lovercheck; Wayne L. Lovercheck; Dale R. Lovercheck

[57]  ABSTRACT

A snow shovel having a main handle and an auxiliary handle. The auxiliary handle is attached to the main handle by means of a flexible material having a slot in it. The slot separates the flexible member into two parts that function as a hinge. The two parts of the flexible member are fixed to the main handle and to the auxiliary handle respectively.

7 Claims, 2 Drawing Sheets

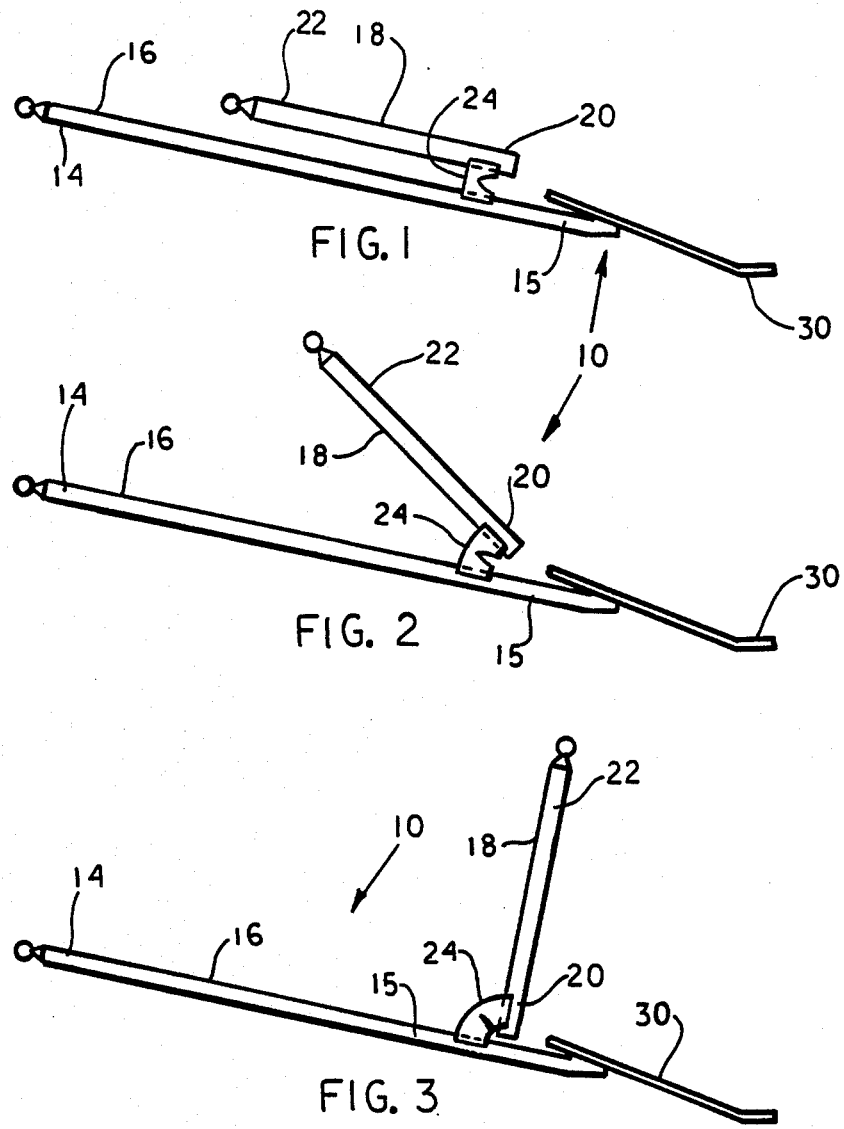

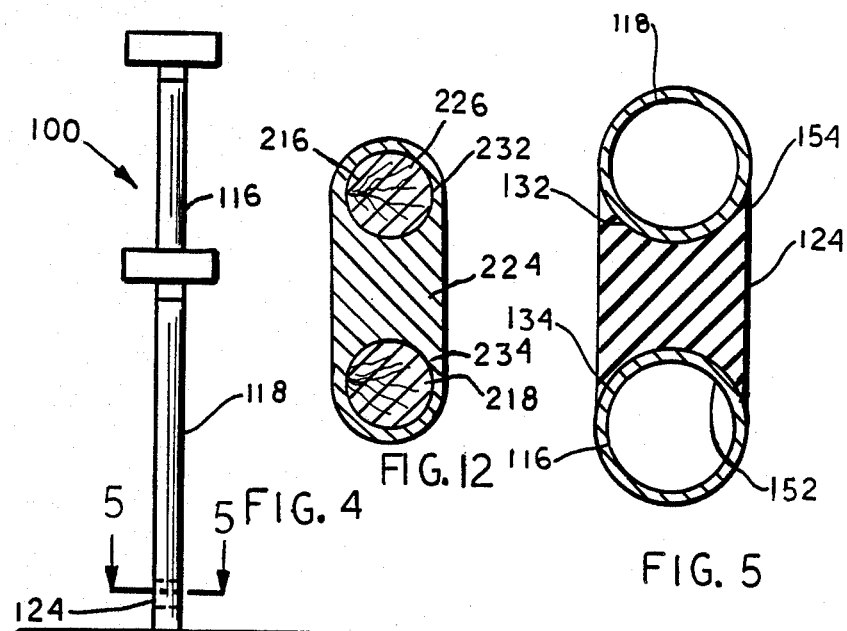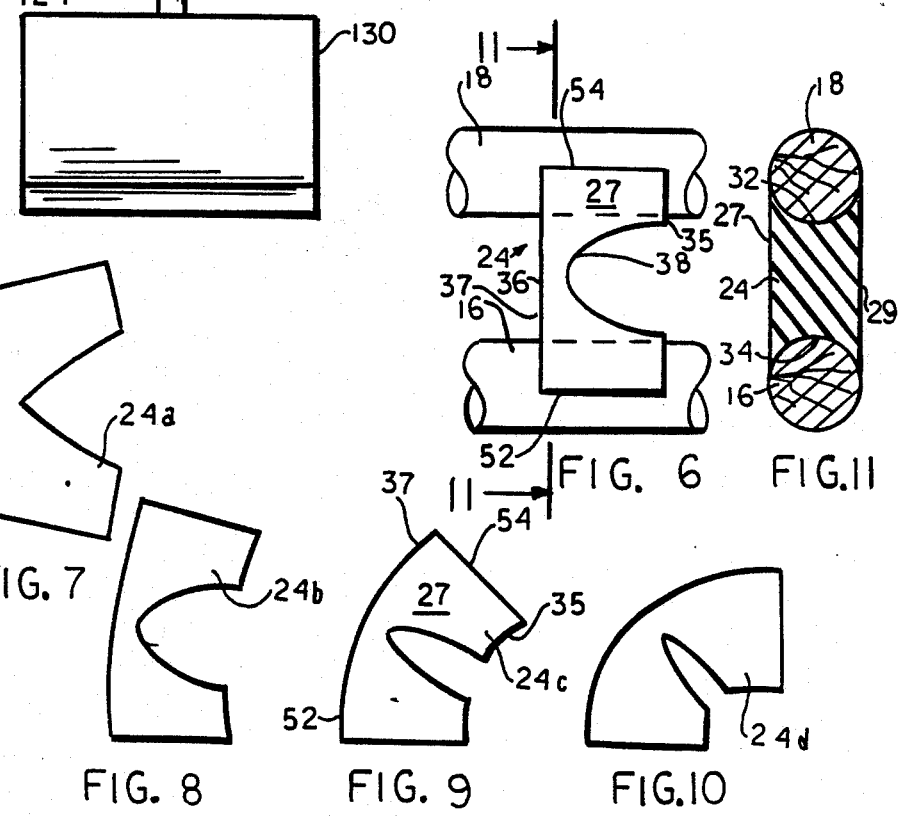

TWO HANDLED SHOVE WITH ELASTOMERIC HINGE

BACKGROUND OF THE INVENTION

A snow shovel having a main handle and an auxiliary handle. The auxiliary handle is attached to the main handle by means of a flexible material having a varying thickness. The thinnest section provides a material that functions as a hinge.

STATEMENT OF THE INVENTION

The shovel is especially suitable for shoveling snow and is sometimes referred to as a swing shovel. The two-handled shovel is designed to allow shoveling without bending over. The shovel limits the use of a person's back muscles. Stronger upper body muscles do what back muscles normally do when using a conventional shovel.

After using the shovel for several hours, I have found that it allows a person to shovel longer, more efficiently and with less fatigue. It is faster because it eliminates needless body motion.

The swing shovel's name comes from the motion involved in its use and the way the entire conventional shovel and load swing from the added handle when the shovel is lifted.

The shovel is especially helpful for people with poor flexibility or back problems and for piling snow when there is little space for it.

The flexible material that attaches the main handle to the auxiliary handle limits side to side movement. The further the handles are moved apart to either side, the greater the resistance to further movement. The flexible material will also urge the return to the aligned position as the force against them is reduced. The slot permits the handles to be easily moved apart and together in the up and down direction as the shovel is held in an operating position.

OBJECTS OF THE INVENTION

It is an object of the invention to provide an improved snow shovel.

Another object of the invention is to provide a snow shovel that has a handle with two parts.

Another object of the invention is to provide a shovel that can be used without bending a person's back.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is a side view of the shovel according to the invention with the handle folded.

FIG. 2 is a side view of the shovel shown in FIG. 1, with the handle partly unfolded.

FIG. 3 is a side view of the shovel according to the invention with the handle fully unfolded.

FIG. 4 is a front view of the shovel according to the invention.

FIG. 5 is a cross sectional view taken on line 5—5 of FIG. 4.

FIG. 6 is a partial enlarged view showing the flexible member.

FIG. 7 is a side view of the flexible member in the position that it will be in when the handles are in the position shown in FIG. 1.

FIG. 8 is an enlarged view of the flexible member in the position that it will be in when the handles are in the position shown in FIG. 2.

FIG. 9 is an enlarged view of the flexible member in the position that it will be in when the handles are in the position shown in FIG. 3.

FIG. 10 is an enlarged view similar to FIG. 9 of the flexible member taken of the embodiment of the invention shown in FIG. 11.

FIG. 11 is a cross sectional view taken on line 11—11 of FIG. 6.

FIG. 12 is a cross sectional view similar to FIG. 5 of another embodiment of the invention.

DETAILED DESCRIPTION OF THE DRAWINGS

Now with more particular reference to the drawings, I show a snow shovel 10 having a main handle 16, having a first end 14, a second end 15 and an auxiliary handle 18 having a first end 20 and second end 22. Auxiliary handle 18 is attached to main handle 16 by means of flexible member 24. Flexible member 24 is a generally rectangular block having a first side 27, a second side 29, a first end 35, a second end 37, intermediate part 36, first edge 54 and second edge 52. First groove 34 is formed in second edge 52 and second groove 32 is formed in first edge 54. Intermediate slot 38 extends part way from first end 35 to a position relatively near to the second end 37 of flexible member 24, dividing flexible member 24 into a first part and a second part connected by an intermediate part 36, which forms a hinge. A shovel blade 30 is attached to second end 25 of main handle 16.

Auxiliary handle 18 and main handle 16 may be both circular in cross section. The diameter of the circular cross section of the handles 16 and 18 are substantially the same as the diameter of grooves 32 and 34. Thus handles 16 and 18 may be cemented in place in grooves 34 and 32 respectively by a suitable bonding material.

When the operator moves the handles 16 and 18 from the position shown in FIG. 1, through the position shown in FIG. 3, intermediate slot 38 will tend to close and intermediate part 36 will flex and act as a hinge.

In the embodiment of the invention shown in FIG. 5, flexible member 124 has first groove 134 and second groove 132. Auxiliary handle 118 is fixed to first edge 154 of flexible member 124. Main handle 116 is supported on second edge 152 of flexible member 124. Handles 116 and 118 are shown as being made of tubular material. As shown in FIG. 4, blade 130 of shovel 100 is attached to main handle 116.

FIGS. 7, 8, 9 and 10 indicate the positions that flexible member 24 will assume when handles 16 and 18 move through four positions by numerals 24a, 24b, 24c and 24d respectively.

In the embodiment of FIG. 12, flexible member 224 has a first bore 232 and a second bore 234 which are formed by material 226 of flexible member 224 molded around main handle 216 and auxiliary handle 218. Main handle 216 is enclosed in flexible member 224 as is handle 218. Thus, material 226 of resilient member 224 is molded around main handle 216 and auxiliary handle 218. This structure increases the contact area of the handles 216 and 218 and the flexible member 224 and thereby increases the overall strength and durability of the snow shovel.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A shovel comprising a main handle having a first end and a second end,
   a shovel blade attached to said second end of said main handle,
   an auxiliary handle having a first end and a second end,
   a flexible elastomeric member,
   said flexible elastomeric member having a first side and a second side,
   said main handle being fixed to a first edge of said flexible elastomeric member along the length of said main handle,
   a second edge of said flexible elastomeric member being fixed to said auxiliary handle at said second end of said auxiliary handle,
   said flexible elastomeric member comprising a body of flexible material providing a hinge swingably connecting said handles together whereby said main handle can swing relative to said auxiliary handle.

2. The shovel recited in claim 1 wherein an intermediate slot is formed in said flexible elastomeric member, extending from a first end of said flexible elastomeric member to a position spaced from a second end, dividing said flexible elastomeric member into a first part and a second part and providing a relatively thin intermediate hinge part between said first part and said second part of said flexible elastomeric member.

3. The shovel recited in claim 2 wherein a first bore is formed in said first part of said flexible elastomeric member and a second bore is formed in said second part of said flexible elastomeric member,
   said main handle is received in said first bore and said auxiliary handle is received in said second bore,
   attaching means is provided connecting said handles to said flexible elastomeric member.

4. The shovel recited in claim 3 wherein said flexible elastomeric member is molded entirely around said handles whereby said flexible elastomeric member completely encircles said handles.

5. The shovel recited in claim 1 wherein a first groove is formed in a first part of said flexible elastomeric member and a second groove is formed in a second part of said flexible elastomeric member,
   said main handle is received in said first groove and said auxiliary handle is received in said second groove,
   attaching means is provided connecting said handles to said flexible member.

6. The shovel recited in claim 5 wherein said attaching means comprises adhesive material connecting said flexible elastomeric member to said handles.

7. The shovel recited in claim 1 wherein said flexible elastomeric member is connected to said main handle at a position along the length of said main handle.

* * * * *